United States Patent [19]
Bruce

[11] Patent Number: 5,855,246
[45] Date of Patent: Jan. 5, 1999

[54] AGRICULTURAL DISC

[76] Inventor: Douglas G. Bruce, 2223 Fourth St., Perry, Iowa 50220

[21] Appl. No.: 872,340

[22] Filed: Jun. 10, 1997

[51] Int. Cl.[6] .................................................. A01B 15/16
[52] U.S. Cl. ......................... 172/604; 172/558; 172/532
[58] Field of Search ................................... 111/163, 167, 111/168, 169; 56/255, 295; 172/558, 599, 604, 532

[56] References Cited

U.S. PATENT DOCUMENTS

| | | | |
|---|---|---|---|
| 3,739,856 | 6/1973 | Ray | 172/532 X |
| 4,098,349 | 7/1978 | Jilani | 172/604 X |
| 5,495,897 | 3/1996 | Javerlhac | 172/604 |
| 5,531,171 | 7/1996 | Whitesel et al. | 172/604 X |
| 5,620,055 | 4/1997 | Javerlhac | 172/604 |

OTHER PUBLICATIONS

Deere & Company Brochure; John Deere 235 Wing–Fold Disk, Copyright©1994–1990, Five (5) pages.
Osmundson, Product Specification List, pp. 10 & 11 (no date).

Primary Examiner—Thomas B. Will
Assistant Examiner—Robert Pezzuto
Attorney, Agent, or Firm—Henderson & Sturm

[57] ABSTRACT

An improved earth-working tool including a disc having a central portion and an outer peripheral portion. The disc is rotatable about a substantially horizontal axis extending through the central portion. A peripheral portion has a plurality of first points along the outer peripheral portion which are closer to the axis than other points on the outer peripheral portion. The first points are substantially equidistantly spaced from the axis. Radially inner sections of the outer peripheral portion are disposed along a line which is substantially tangential to an arc formed around the axis of rotation and through the first points, whereby the substantially tangential sections will tend to cut residue on top of the soil in a more downward direction than conventional circular discs do. The discs also have radially outer sections on the outer peripheral portion which are not along the substantially tangential lines and which are further from the axis than the first points. An alternate embodiment has an outer periphery with alternating radially inward and radially outward arcuate sections, the inward arcuate sections being longer than the outer sections.

10 Claims, 5 Drawing Sheets

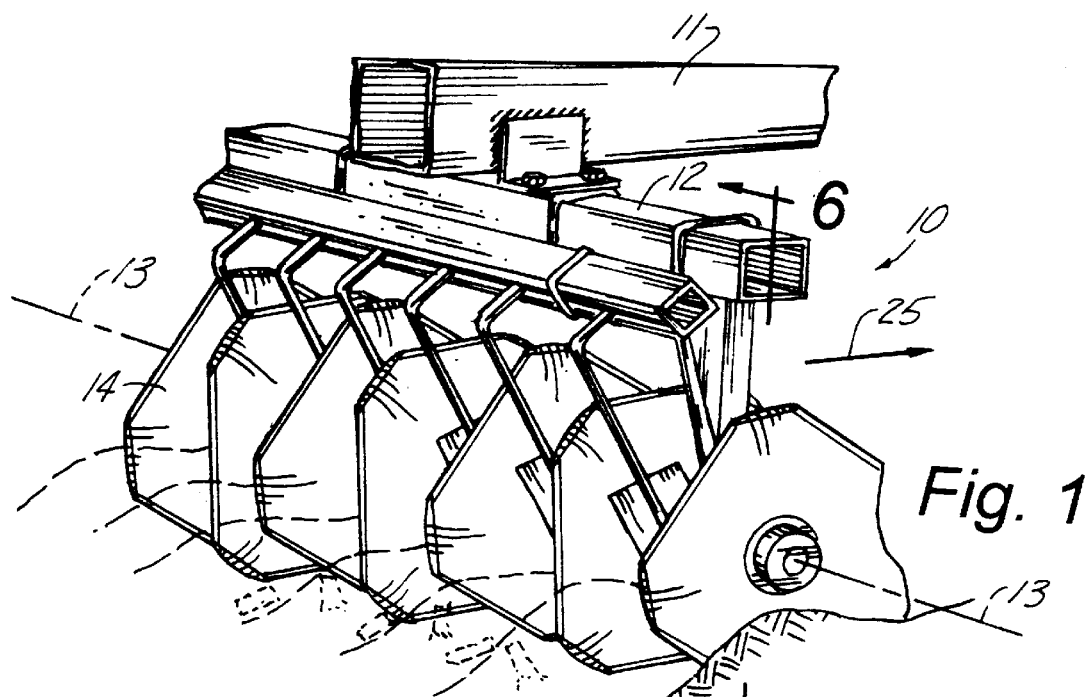
Fig. 1
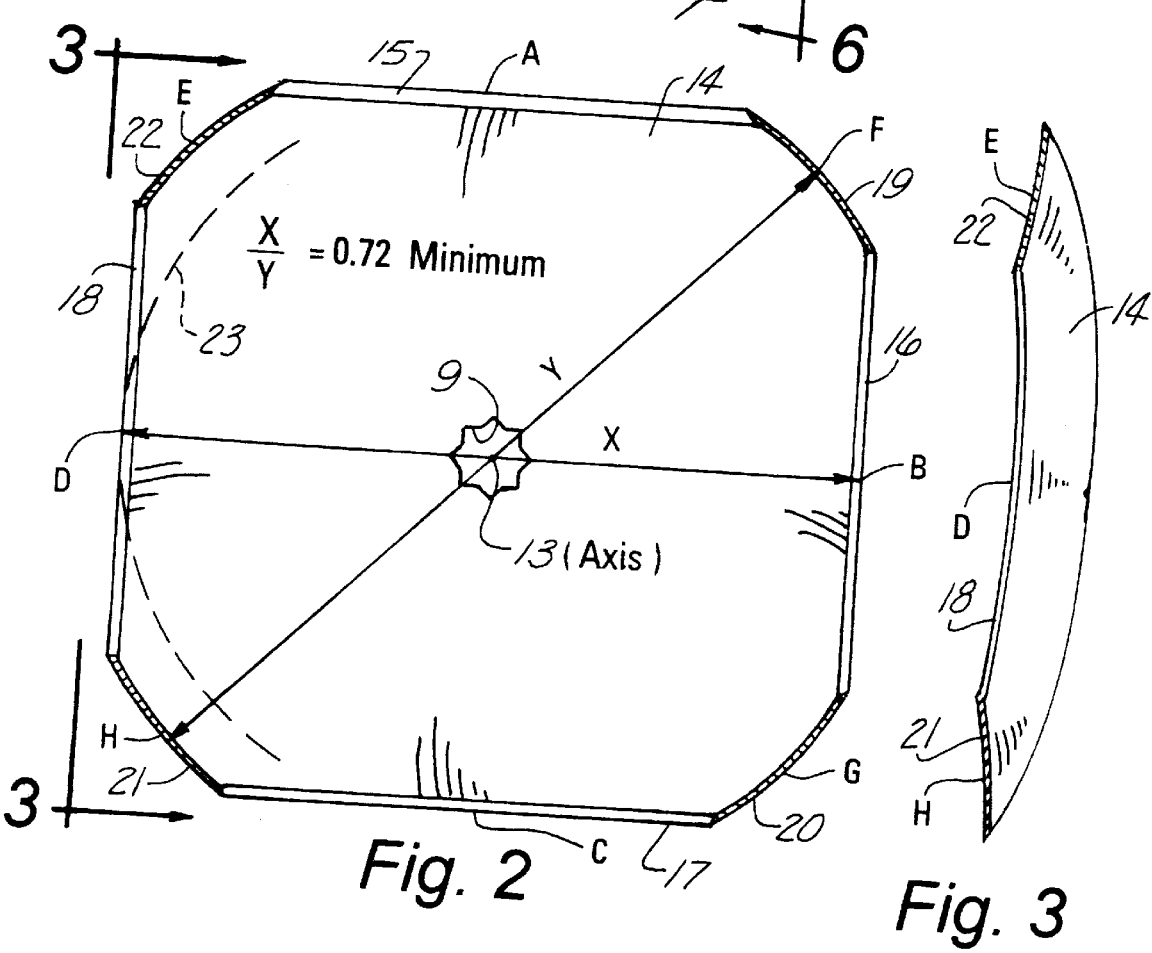
Fig. 2
Fig. 3

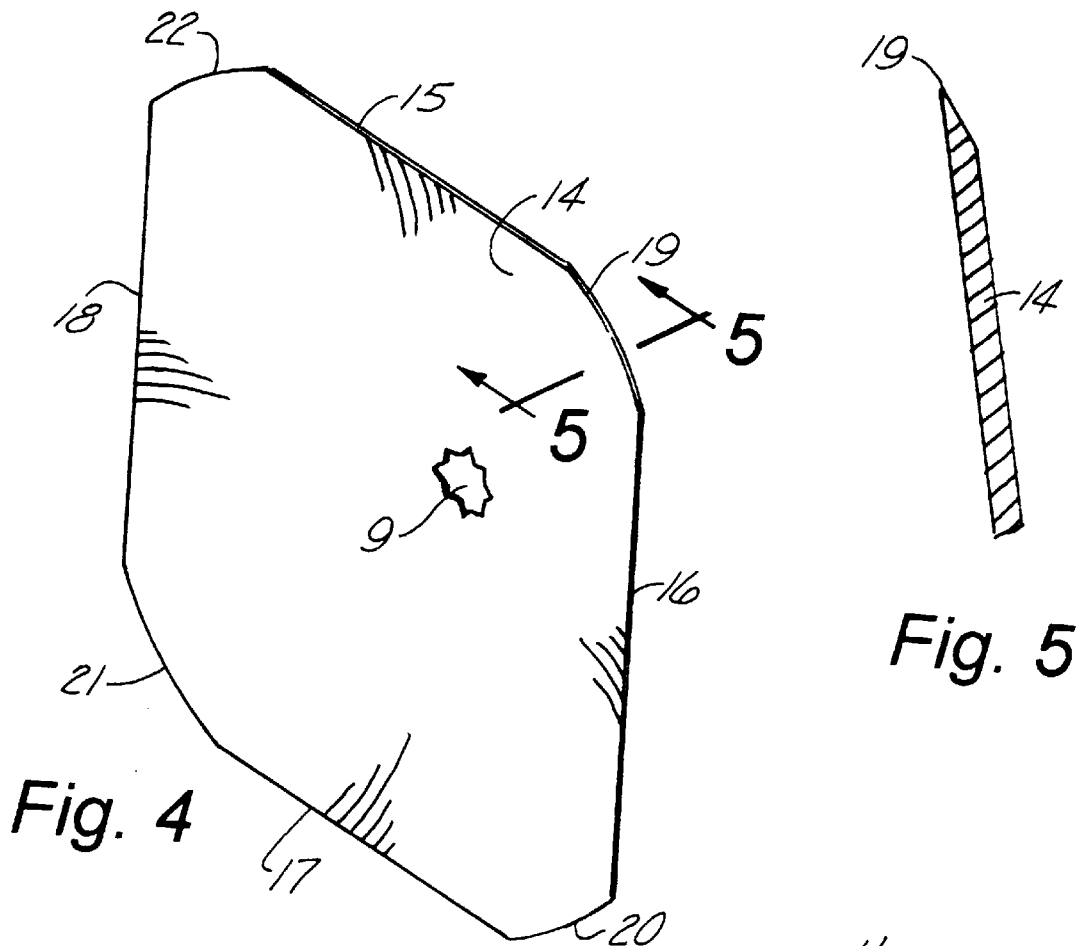
Fig. 4
Fig. 5
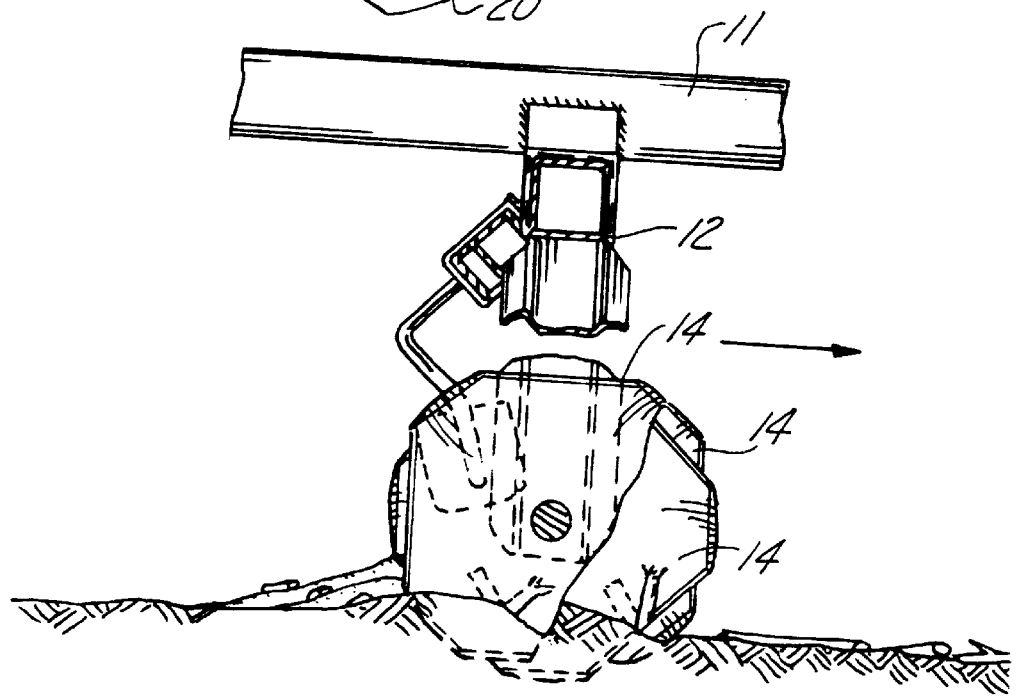
Fig. 6

AGRICULTURAL DISC

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF INVENTION

1. Field of the Invention

This invention relates to an agricultural disc and more particularly to an agricultural disc of a novel design which cuts through crop residue better than prior art devices and further has a novel outer peripheral configuration which manipulates the soil better than prior art designs.

2. Description of Prior Art

Most prior art discs and coulters are round. These discs or coulters roll through the soil, and in the case of discs, soil is thrown in a direction away from the concave side thereof. One of the problems associated with round discs or coulters is that the cutting angle of the disc is not even close to being parallel with the top surface of the ground during the cutting process. Rather than cutting or chopping through the crop residue, such as corn stalks, the crop residue is pinned against the ground and then sliced as the disc turns into the ground.

Also, in the manufacture of round discs, a substantial amount of material is wasted because typically the discs are formed from sheets of material which are square or rectangular and the corner portion of each sheet used to construct a round disc becomes essentially scrap material.

Consequently, there is a need for discs which tend to cut crop residue more like scissors and which do not have to be forced into the ground like round discs. Also, there is a need for disc structures which tend to aerate or fluff the soil more than round discs, and therefore create a more severe stirring action of the soil.

Those concerned with these and other problems of the prior art recognize the need for an improved earth-working disc.

BRIEF SUMMARY OF THE INVENTION

The present invention relates to an improved earth-working tool including a disc having a central portion and an outer peripheral portion. The disc is rotatable about a substantially horizontal axis extending through the central portion, the peripheral portion includes a plurality of first points along the outer peripheral portion which are closer to the axis than other points on the outer peripheral portion. The first points are substantially equidistantly spaced from the axis. Radially inner sections of the outer peripheral portion are disposed along the line which is substantially tangential to an arc formed around the axis and through the first points whereby the substantially tangential sections will tend to cut residue on top of the soil in a more downward direction than conventional circular discs do. The discs also have radially outer sections on the outer peripheral portion which are not along the substantially tangential lines and which are further from the axis than the first points.

In one embodiment of the present invention, one side of the disc is convex and the other is concave. In a still further improvement of the invention, a plurality of discs are mounted for rotation along a common axis, each adjacent disc being mounted 45° out of phase with respect to each other.

In still a further improvement of the present invention, there is a plurality of second points along the outer periphery of each disc which are farther from the axis than the first points and are located on the radially outer sections of the outer peripheral portions. The second points are arranged in pairs of diagonally opposite points. The first points are also arranged in pairs of diagonally opposite points. The distance between one of the pairs of first points divided by the distance between one of the pairs of second points is at least 0.72. This ratio creates scissor-like action for cutting crop residue from previous years and also aerates the soil better than prior art circular discs do.

In a still further embodiment of the invention, the outer periphery of the discs includes alternating radially inward and then radially outward arcuate sections, the inward sections being substantially longer in length than the radially outward arcuate sections.

An object of the present invention is to provide an improved earth-working tool which is in the form of a disc or coulter rotatable about a central portion.

Another object of the present invention is to provide an improved earth-working disc which cuts crop residue more like scissors than do conventional circular discs of the prior art.

Another object of the present invention is to provide an earth-working disc which tends to aerate and fluff the soil more than prior art discs do.

A still further object of the present invention is to provide an agricultural disc which does not need to be forced into the ground, but mechanically helps itself into the ground.

A still further object of the present invention is to provide an agricultural disc which can be constructed with considerably less waste of steel than discs heretofore manufactured.

A still firther object of the present invention is to provide a disc which not only uses less material but is easier and cheaper to make than prior art discs.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 1 is a perspective view of an agricultural disc constructed in accordance with the present invention;

FIG. 2 is a side view of a preferred embodiment of one of the discs of the present invention;

FIG. 3 is a side elevational view of the disc of FIG. 2 and shows how the left side is concave and the right side is convex;

FIG. 4 is a perspective view of the disc of FIGS. 2 and 3;

FIG. 5 is an enlarged partial cross sectional view taken along lines 5—5 of FIG. 4;

FIG. 6 is a view of the agricultural implement shown in FIG. 1 taken along line 6—6 of FIG. 1;

DETAILED DESCRIPTION OF THE DRAWINGS

Figure 7:
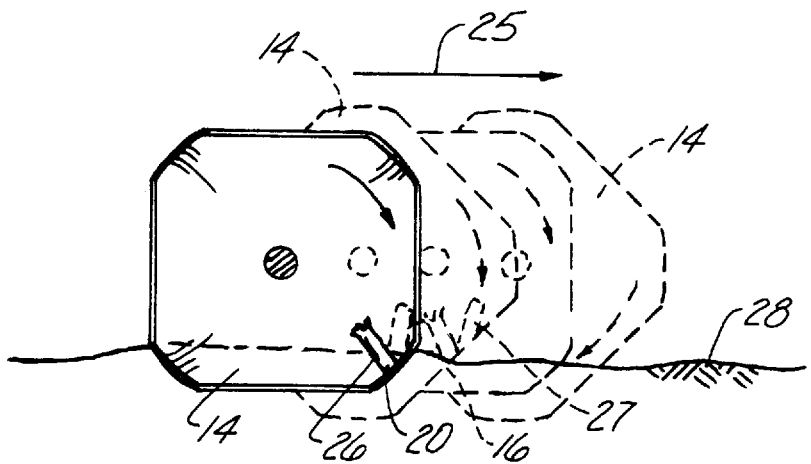
FIG. 7 is a view showing the movement of one of the discs shown in FIG. 2 as it moves through soil and cuts crop residue such as corn stalks.

Referring now to the drawings wherein like reference numerals designate identical or corresponding parts throughout the several views, FIG. 1 shows one gang (10) of an offset disc apparatus for use in working the soil. FIG. 1 shows a frame (11) which is ultimately attached to a prime mover (not shown). The frame (11) has a toolbar (12) attached thereto and the gang of discs (10) have individual discs (14) thereon which are rotatably attached about a horizontal axis through the centers of each of the discs (14). The particular discs (14) shown in FIG. 1 are offset by 45° for reasons which will be explained below.

Referring now to FIGS. 2 and 3, one of the discs (14) is shown having a star-shaped opening (9) in the center thereof for rotation in the disc arrangement of FIG. 1, which is a conventional mounting structure (not shown). The outer peripheral portion of the disc (14) includes a plurality of straight sides (15), (16), (17) and (18) which are connected together by curved outer portions (19), (20), (21) and (22). A plurality of first points A, B, C, and D are the closest points to the central axis (13) of the disc (14) and the straight sides (15), (16), (17) and (18) are formed as a tangent of an arc (23) shown as a dashed line passing through one of points D in FIG. 2, the arc (23) being formed about the axis (13). Of course all of the other tangential lines (15), (16) and (17) are similarly formed in the manner that tangential line (18) is formed through point D.

Figure 8:
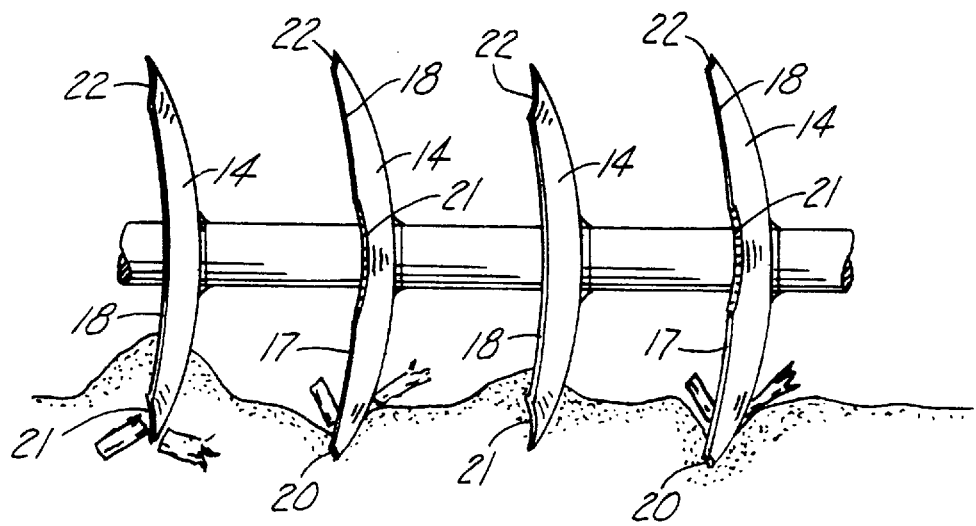
FIG. 8 is a view from the front or rear of the device of FIG. 1 and shows how the discs are mounted side-by-side, how they cut crop residue and how they aerate the soil.

The radius of curvature of the radially outer sections (19), (20), (21) and (22) of the outer peripheral portion can be formed as an arc around the axis (13) or they can be formed by an arc which is either shorter or longer than the arc formed between, for example, axis (13) and point F. A plurality of second points F, G, H and E, which are midpoints on the radially outer sections (19), (20), (21) and (22), respectively, are present to show a relationship between pairs of radially opposed outer second points, for example F and H such distance being shown by the letter Y in FIG. 2. The distance between diagonally opposed first points A, B, C, and D is shown by the distance X between points B and D in FIG. 2. It has been determined that the ratio of distances X over Y should be a minimum of 0.72 so that the disc will properly cut crop residue like scissors and still aerate as shown in FIGS. 6, 7 and 8. Referring to FIGS. 2 and 3, all of the surfaces (15), (16), (17), (18), (19), (20), (21) and (22) are preferably beveled as shown in FIG. 5, although the disc will work just fine without being beveled.

The operation of the embodiment of FIGS. 1–6 is such that the disc gangs (10) are merely pulled in a forward direction, for example as shown by the bold arrow (25) in FIG. 1. This gang (10) of discs (14) can either have the axis of rotation (13) perpendicular to the forward direction of travel (25), or preferably, the angle between the forward direction (25) and the axis (13) can be at an angle other than perpendicular or parallel, just as in prior art discing devices or implements.

Referring now to FIG. 7, the disc (14) is shown rotating in a clockwise fashion in the forward direction (25) and as it does, the crop residue such as corn stalk (26) is cut by edge (20). As the disc rotates, another corn stalk, shown by dashed lines (27), is cut by a straight portion (16). It should be noted that the action of the disc (14), in conjunction with the ground (28), is more of a scissors-like cutting action than it would be if the disc were circular as in prior art discs. Therefore, the cutting is more complete than it otherwise might be and furthermore the disc (14) does not have to be forced into the ground. Rather, the disc (14) actually mechanically helps itself into the ground as can be appreciated from viewing the various stages of rotation of the disc (14) shown in FIG. 7. As it does so, the lower or outer portion, such as portion (20), goes deeper into the ground than the tangential portions (15), (16), (17) or (18), thereby causing the soil to be pulled up as the outer portions of the disc rotate through the ground. This creates aeration and fluffing of the soil, as shown in FIG. 8. This also creates a more severe stirring action of the soil than circular discs do.

Figures 9, 10:
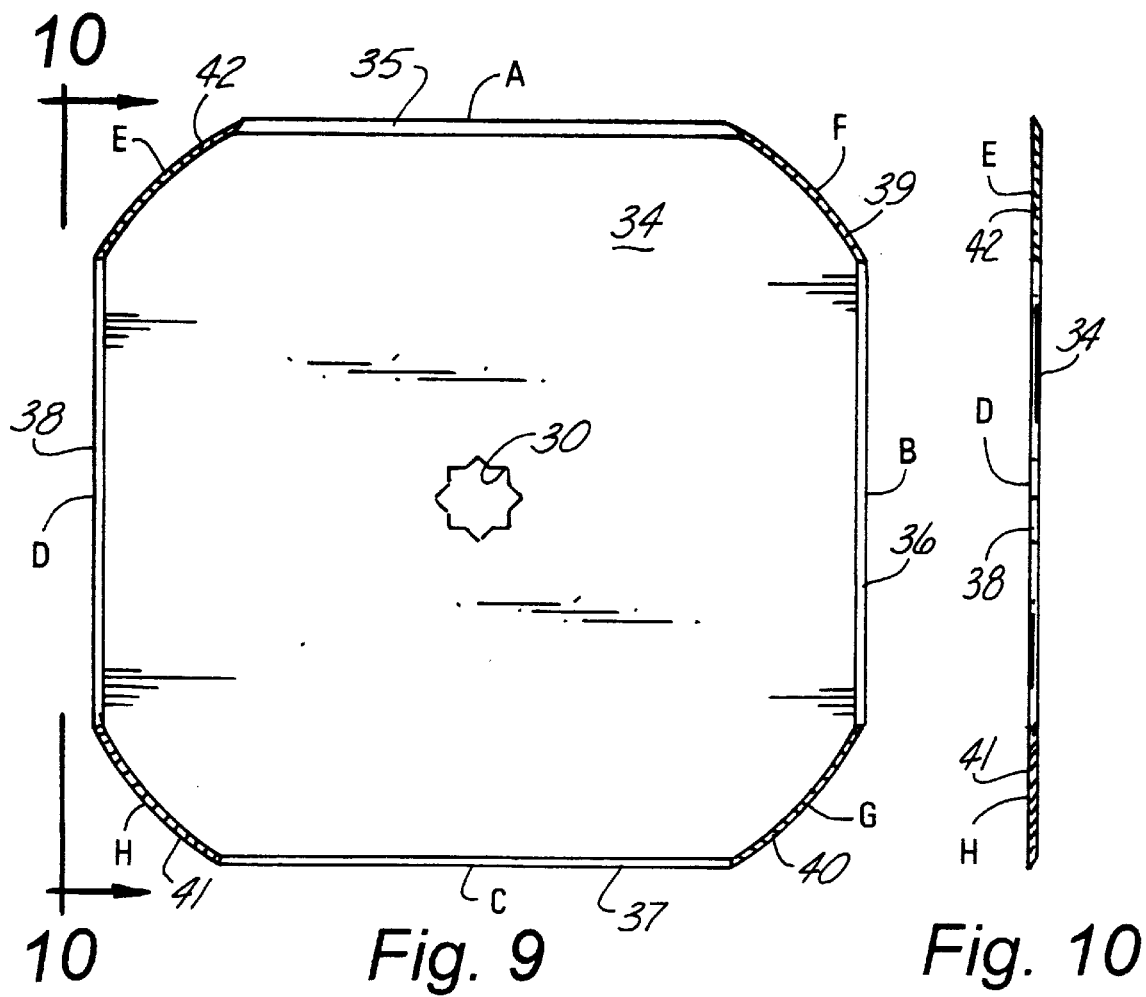
FIG. 9 shows one side of a coulter constructed in accordance with the present invention.
FIG. 10 shows a side elevational view taken along line 10—10 of FIG. 9 showing the coulter to be flat.

Referring now to FIGS. 9 and 10, a coulter (34) is shown having a center portion (30) and radially inner sections (35), (36), (37) and (38) of an outer peripheral portion, which also includes radial outer sections (39), (40), (41) and (42). For simplicity, the first points along the outer peripheral portions of the radially inner sections have also been labeled A, B, C and D as in the FIG. 2 embodiment, and the sections of the outer portion have been labeled with the letters E, F, G and H as in the FIG. 2 embodiment.

The coulter (34) is, of course, useful anywhere any other coulter is useful, for example, on planters or the like. The coulter (34) still cuts like scissors in the manner of the disc (14) of FIG. 7 and forces itself into the ground easily and has other advantages like cutting more straight down on crop residue as in the disc (14) of FIG. 7 than circular coulters do. Of course, the straight coulter (34) does not throw soil to one side or the other, but still can be easily manufactured with about twenty-percent less material, which also cuts down on labor in addition to reducing steel waste. The disc (34) of FIGS. 9 and 10 also is preferably constructed of a ratio of X over Y having a minimum of 0.72 as shown in the FIG. 2 embodiment.

Figures 11, 12:
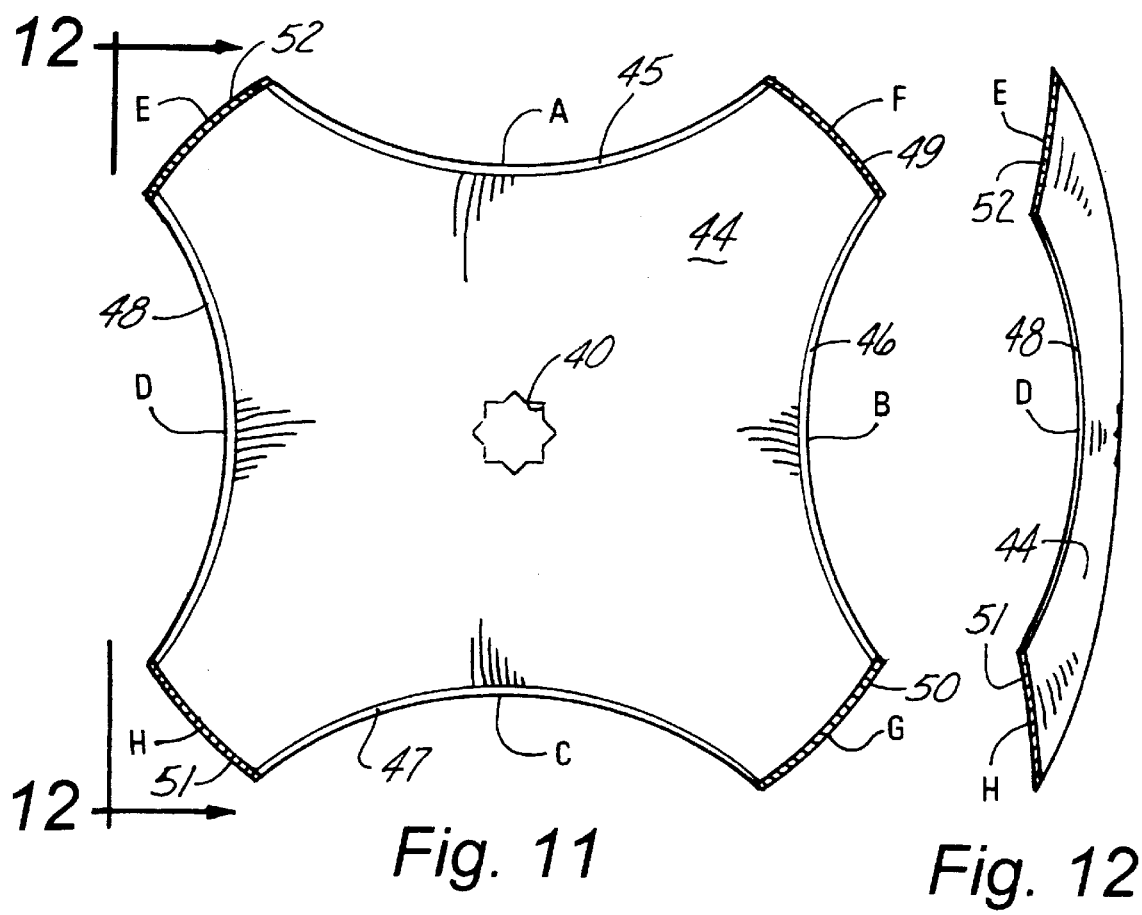
FIG. 11 shows one side of a still further embodiment of the invention with alternating inward and outward arcuate sections of the exterior periphery of the disc.
FIG. 12 is a side elevational view of the disc of FIG. 10 taken along 10—10 of FIG. 11.

Referring now to FIGS. 11 and 12 an alternate embodiment shows radially inner arcuate sections 45, 46, 47 and 48 of the outer periphery of disc (44) separated by outer radial sections 49, 50, 51 and 52 of the outer periphery of disc (44). There are no more than four of the inner arcuate sections so that they will be long enough to cut like scissors and so the disc can economically be made from a common square shape to eliminate wasted material. It could also be made from a triangular piece of material, in which case there would only be three long inward sections like 45, 46, 47 and 48 and only three shorter outer radial sections similar to sections 49, 50, 51 and 52 of the FIG. 11 embodiment. The invention of FIGS. 1–10 also is not limited to a four sided disc and can, in fact have more or less than four sides.

Obviously many modifications and variations of the present invention are possible in light of the above teachings. It is therefore to be understood that, within the scope of the appended claims, the invention may be practiced otherwise than as specifically described.

What is claimed is:

1. An earth working tool for working soil comprising:
   a disc gang comprising a plurality of discs, said plurality of discs comprising an end disc at each end of said disc gang and an intermediate disc located in between each end disc, wherein each said end disc and said intermediate disc of said disc gang comprises a central portion 16 and an outer peripheral portion, 18 wherein each of said disc is rotatable about a substantially horizontal axis extending through the central portion, said outer peripheral portion including a plurality of first points along the outer peripheral portion which are closer to said axis than other points on the outer peripheral portion, said first points being substantially equidistantly spaced from the axis;

wherein said outer peripheral portion comprises:

a radially inner section disposed along a substantially tangential line which is substantially tangential to an arc formed around said axis and through said first points as a substantially tangential section whereby said substantially tangential section will tend to cut residue on top of the soil in a more downward direction than conventional circular discs do; and a radially outer section of the outer peripheral portion which is not along said substantially tangential line and which is farther from said axis than said first points; and wherein said radially inner section of the outer peripheral portion is longer than said radially outer section of the outer peripheral portion.

2. The tool of claim 1 wherein one side of said disc is convex and another side of said disc is concave.

3. The tool of claim 2 wherein said plurality of discs are mounted for rotation along a common axis, and comprise adjacent dscs, wherein each adjacent disc is mounted 45 degrees out of phase with a next adjacent disc whereby said radially outer section of one disc will be aligned with a center of one radially inner section of each adjacent disc.

4. The tool of claim 1 comprising a plurality of second points along the outer periphery which are farther from said axis than said first points and are located on said radially outer sections of the outer peripheral portion, said second points being in pairs of diagonally opposite points, said first points also being arranged in pairs of diagonally opposite points whereby the distance between one of said pairs of first points divided by the distance between one of the pairs of second points is at least 0.72.

5. An earth working tool comprising:

a disc gang comprising a plurality of discs, said plurality of discs comprising an end disc at each end of said disc gang and an intermediate disc located in between each end disc, wherein each said end disc and said intermediate disc of said disc gang comprises a central portion and an outer peripheral portion wherein each of said discs is rotatable about a substantially horizontal rotary axis extending through the central portion, said peripheral portion including a plurality of first points along the outer peripheral portion which are closer to said axis than other points on the outer peripheral portion, said first points being substantially equidistantly spaced from the rotary axis;

wherein said outer peripheral portion comprises:

at least one radially inner section disposed along a line which is formed substantially by an arc formed around an axis radially outwardly from said rotary axis and radially outwardly from one of said first points whereby said section will tend to cut residue on top of the soil in a more downward direction than conventional circular discs do; and a radially outer section of the outer peripheral portion which is not along said inner section being disposed farther from said rotary axis than said first points; and wherein said at least one inner radial section comprises no more than four inner radial sections on the outer periphery, each of said inner radial sections being spaced from a next adjacent inner radial section by a radially outer section.

6. The earth working tool of claim 5 wherein one side of said disc is convex and another side of said disc is concave.

7. The earth working tool of claim 6 wherein said plurality of discs are mounted for rotation along a common axis, and comprise adjacent disc wherein each adjacent disc is mounted 45 degrees out of phase with a next adjacent disc whereby said radially outer section of one disc will be aligned with a center of one of the radially inner sections of each adjacent disc.

8. The earth working tool of claim 5 wherein said disc is substantially symmetrical.

9. The earth working tool of claim 5 wherein said disc includes four radially inner sections each adjacent inner section being separated by one of four radially outer sections and whereby said inner sections are at least twice as long as said outer sections.

10. The earth working tool of claim 5, wherein said at least one inner radially section consists of four radially inner sections.

\* \* \* \* \*

UNITED STATES PATENT AND TRADEMARK OFFICE
CERTIFICATE OF CORRECTION

PATENT NO : 5,855,246
DATED : January 5, 1999
INVENTOR(S) : Douglas G. Bruce

It is certified that error appears in the above-identified patent and that said Letters Patent is hereby corrected as shown below:

In the Claims, column 5, line 4, delete "16"

In the Claims, column 5, line 4, delete "18"

Signed and Sealed this

Sixth Day of July, 1999

Attest:

Q. TODD DICKINSON

*Attesting Officer*     *Acting Commissioner of Patents and Trademarks*